(12) United States Patent
Layne et al.

(10) Patent No.: US 9,971,654 B2
(45) Date of Patent: May 15, 2018

(54) SAFE STORING DATA FOR DISASTER RECOVERY

(71) Applicant: JPMorgan Chase Bank, N.A., New York, NY (US)

(72) Inventors: Mitchell Layne, Lutz, FL (US); Herb Stranzl, New York, NY (US); Thomas G. Allaire, Seaford, NY (US); Erol Raymond, New Providence, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 23 days.

(21) Appl. No.: 15/018,964

(22) Filed: Feb. 9, 2016

(65) Prior Publication Data
US 2016/0154708 A1   Jun. 2, 2016

Related U.S. Application Data

(63) Continuation of application No. 13/187,479, filed on Jul. 20, 2011, now Pat. No. 9,292,588.

(51) Int. Cl.
*G06F 1/12* (2006.01)
*G06F 13/42* (2006.01)
(Continued)

(52) U.S. Cl.
CPC ...... *G06F 11/1451* (2013.01); *G06F 11/1469* (2013.01); *G06F 11/202* (2013.01);
(Continued)

(58) Field of Classification Search
CPC ............ G06F 11/1451; G06F 11/1469; G06F 11/202; G06F 11/2097; G06F 17/30377;
(Continued)

(56) References Cited

U.S. PATENT DOCUMENTS

| 3,872,448 A | 3/1975 | Mitchell, Jr. |
| 5,159,687 A | 10/1992 | Richburg |

(Continued)

FOREIGN PATENT DOCUMENTS

| WO | 95/03586 | 2/1995 |
| WO | 96/34350 | 10/1996 |
| WO | 02/046980 | 6/2002 |

OTHER PUBLICATIONS

Alin Deutsch et al, Storing Semistructured Data with STORED, ACM SIGMOD Rec., pp. 431-442 (1999).
(Continued)

*Primary Examiner* — Xuxing Chen
(74) *Attorney, Agent, or Firm* — Hunton Andrews Kurth LLP (57) ABSTRACT

A computer-implemented method and system for safe storing data is disclosed. A sending queue manager associated with a client computer transmits an asynchronous write of a transaction message containing data to a receiving queue manager associated with a transaction processing computer not colocated with the client computer. The receiving queue manager transmits a synchronous write of the transaction message to a remote queue manager associated with a remote disaster recovery computer to safe store the transaction message before it can be operated upon by the transaction processing computer.

20 Claims, 5 Drawing Sheets

(51) Int. Cl.
  *H04L 5/00*    (2006.01)
  *H04L 7/00*    (2006.01)
  *G06F 11/14*   (2006.01)
  *G06F 17/30*   (2006.01)
  *G06F 11/20*       (2006.01)
  *H04L 29/08*       (2006.01)

(52) U.S. Cl.
  CPC .... *G06F 11/2097* (2013.01); *G06F 17/30377*
        (2013.01); *G06F 17/30575* (2013.01); ***G06F
        17/30581*** (2013.01); *G06F 11/1458* (2013.01);
            *G06F 11/1464* (2013.01); *G06F 11/1471*
        (2013.01); *G06F 11/1474* (2013.01); *G06F
        11/2038* (2013.01); *G06F 11/2048* (2013.01);
            *G06F 11/2056* (2013.01); *G06F 11/2082*
        (2013.01); *G06F 2201/80* (2013.01); *G06F
        2201/84* (2013.01); *H04L 67/1095* (2013.01)

(58) Field of Classification Search
  CPC ......... G06F 17/30575; G06F 17/30581; G06F
            11/1458; G06F 11/1464; G06F 11/1471;
            G06F 11/1474; G06F 11/2038; G06F
            11/2048; G06F 11/2056; G06F 11/2082;
                                        G06F 2201/80
  See application file for complete search history.

(56) References Cited

U.S. PATENT DOCUMENTS

| | | |
|---|---|---|
| 5,168,444 A | 12/1992 | Cukor et al. |
| 5,202,986 A | 4/1993 | Nickel |
| 5,278,982 A | 1/1994 | Daniels et al. |
| 5,313,616 A | 5/1994 | Cline et al. |
| 5,347,518 A | 9/1994 | Lee |
| 5,455,946 A | 10/1995 | Mohan et al. |
| 5,471,613 A | 11/1995 | Banning et al. |
| 5,471,629 A | 11/1995 | Risch |
| 5,630,173 A | 5/1997 | Oprescu |
| 5,701,471 A | 12/1997 | Subramanyam |
| 5,748,878 A | 5/1998 | Rees et al. |
| 5,752,034 A | 5/1998 | Srivastava |
| 5,758,061 A | 5/1998 | Plum |
| 5,764,972 A | 6/1998 | Crouse et al. |
| 5,774,553 A | 6/1998 | Rosen |
| 5,784,557 A | 7/1998 | Oprescu |
| 5,787,402 A | 7/1998 | Potter et al. |
| 5,828,883 A | 10/1998 | Hall |
| 5,832,523 A | 11/1998 | Kanai et al. |
| 5,835,770 A | 11/1998 | Shum et al. |
| 5,845,293 A | 12/1998 | Veghte et al. |
| 5,872,976 A | 2/1999 | Yee et al. |
| 5,907,346 A | 5/1999 | Berner et al. |
| 5,920,719 A | 7/1999 | Sutton et al. |
| 5,978,477 A | 11/1999 | Hull et al. |
| 6,009,405 A | 12/1999 | Leymann et al. |
| 6,012,087 A | 1/2000 | Frevald et al. |
| 6,014,671 A | 1/2000 | Castelli et al. |
| 6,026,237 A | 2/2000 | Berry et al. |
| 6,029,002 A | 2/2000 | Afifi et al. |
| 6,029,175 A | 2/2000 | Chow et al. |
| 6,058,393 A | 5/2000 | Meier et al. |
| 6,065,009 A | 5/2000 | Leymann et al. |
| 6,081,808 A | 6/2000 | Blackman et al. |
| 6,108,698 A | 8/2000 | Tenev et al. |
| 6,125,390 A | 9/2000 | Touboul |
| 6,138,112 A | 10/2000 | Slutz |
| 6,138,158 A | 10/2000 | Boyle et al. |
| 6,145,121 A | 11/2000 | Levy et al. |
| 6,163,776 A | 12/2000 | Periwal |
| 6,167,534 A | 12/2000 | Straathof et al. |
| 6,188,400 B1 | 2/2001 | House et al. |
| 6,226,652 B1 | 5/2001 | Precival et al. |
| 6,237,143 B1 | 5/2001 | Fontana et al. |
| 6,243,862 B1 | 6/2001 | Lebow |
| 6,256,635 B1 | 7/2001 | Arrouye et al. |
| 6,263,121 B1 | 7/2001 | Melen et al. |
| 6,266,683 B1 | 7/2001 | Yehuda et al. |
| 6,269,479 B1 | 7/2001 | Puram |
| 6,279,008 B1 | 8/2001 | Tung Ng et al. |
| 6,301,701 B1 | 10/2001 | Walker et al. |
| 6,311,320 B1 | 10/2001 | Jibbe |
| 6,311,327 B1 | 10/2001 | O'Brien et al. |
| 6,336,122 B1 | 1/2002 | Lee et al. |
| 6,356,920 B1 | 3/2002 | Vandersilius |
| 6,381,609 B1 | 4/2002 | Breitbart et al. |
| 6,385,618 B1 | 5/2002 | Ng et al. |
| 6,397,221 B1 | 5/2002 | Greef et al. |
| 6,405,209 B2 | 6/2002 | Obendorf |
| 6,411,957 B1 | 6/2002 | Dijkstra |
| 6,418,446 B1 | 7/2002 | Lection et al. |
| 6,418,448 B1 | 7/2002 | Sarkar |
| 6,418,451 B1 | 7/2002 | Maimone |
| 6,449,623 B1 | 9/2002 | Bohannon et al. |
| 6,453,310 B1 | 9/2002 | Zander |
| 6,456,995 B1 | 9/2002 | Salo et al. |
| 6,467,052 B1 | 10/2002 | Kaler et al. |
| 6,477,540 B1 | 11/2002 | Singh et al. |
| 6,490,581 B1 | 12/2002 | Neshatfar et al. |
| 6,502,095 B2 | 12/2002 | Breitbart et al. |
| 6,502,104 B2 | 12/2002 | Fung et al. |
| 6,532,467 B1 | 3/2003 | Broclebank et al. |
| 6,535,894 B1 | 3/2003 | Schmidt et al. |
| 6,539,337 B1 | 3/2003 | Provan et al. |
| 6,539,383 B2 | 3/2003 | Charlet et al. |
| 6,539,397 B1 | 3/2003 | Doan et al. |
| 6,539,398 B1 | 3/2003 | Hannan et al. |
| 6,557,039 B1 | 4/2003 | Leong et al. |
| 6,564,048 B1 | 5/2003 | Sugita |
| 6,571,249 B1 | 5/2003 | Garrecht et al. |
| 6,574,640 B1 | 6/2003 | Stahl |
| 6,578,129 B1 | 6/2003 | da Silva, Jr. |
| 6,591,260 B1 | 7/2003 | Scwarzhoff et al. |
| 6,601,075 B1 | 7/2003 | Huang et al. |
| 6,651,076 B1 | 11/2003 | Asano |
| 6,665,086 B2 | 12/2003 | Hull et al. |
| 6,678,705 B1 | 1/2004 | Brechtold et al. |
| 6,681,380 B1 | 1/2004 | Britton et al. |
| 6,691,139 B2 | 2/2004 | Ganesh et al. |
| 6,697,835 B1 | 2/2004 | Hanson et al. |
| 6,701,514 B1 | 3/2004 | Haswell et al. |
| 6,711,594 B2 | 3/2004 | Yano et al. |
| 6,714,219 B2 | 3/2004 | Lindhorst et al. |
| 6,763,384 B1 | 7/2004 | Gupta et al. |
| 6,880,010 B1 | 4/2005 | Webb et al. |
| 6,918,013 B2 | 7/2005 | Jacobs et al. |
| 6,920,467 B1 | 7/2005 | Yoshimoto |
| 6,934,934 B1 | 8/2005 | Osborne, II et al. |
| 6,938,072 B2 | 8/2005 | Berman et al. |
| 7,010,757 B2 | 3/2006 | Stana et al. |
| 7,340,490 B2 | 3/2008 | Teloh et al. |
| 7,406,572 B1 | 7/2008 | Lam et al. |
| 7,734,884 B1 | 6/2010 | Marshak et al. |
| 7,797,571 B2 | 9/2010 | Zohar et al. |
| 2002/0007287 A1 | 1/2002 | Straube et al. |
| 2002/0029228 A1 | 3/2002 | Rodriguez et al. |
| 2002/0038226 A1 | 3/2002 | Tyus |
| 2002/0038320 A1 | 3/2002 | Brook |
| 2002/0049666 A1 | 4/2002 | Reuter et al. |
| 2002/0065695 A1 | 5/2002 | Francoeur et al. |
| 2002/0083034 A1 | 6/2002 | Orbanes et al. |
| 2002/0091702 A1 | 7/2002 | Mullins |
| 2002/0116205 A1 | 8/2002 | Ankireddipally et al. |
| 2002/0143774 A1 | 10/2002 | Vandersluis |
| 2002/0144101 A1 | 10/2002 | Wang et al. |
| 2002/0147774 A1 | 10/2002 | Lisiecki et al. |
| 2002/0178439 A1 | 11/2002 | Rich et al. |
| 2002/0188765 A1 | 12/2002 | Fong et al. |
| 2003/0014421 A1 | 1/2003 | Jung |
| 2003/0018666 A1 | 1/2003 | Chien et al. |
| 2003/0027561 A1 | 2/2003 | Iyer |
| 2003/0046313 A1 | 3/2003 | Leung et al. |
| 2003/0050931 A1 | 3/2003 | Harman et al. |

(56) References Cited

U.S. PATENT DOCUMENTS

| | | |
|---|---|---|
| 2003/0065644 A1 | 4/2003 | Horman et al. |
| 2003/0069975 A1 | 4/2003 | Abjanic et al. |
| 2003/0070158 A1 | 4/2003 | Lucas et al. |
| 2003/0088593 A1 | 5/2003 | Stickler |
| 2003/0126151 A1 | 7/2003 | Jung |
| 2003/0131007 A1 | 7/2003 | Schirmer et al. |
| 2003/0140045 A1 | 7/2003 | Heninger et al. |
| 2003/0140308 A1 | 7/2003 | Murthy et al. |
| 2003/0145047 A1 | 7/2003 | Upton |
| 2003/0163603 A1 | 8/2003 | Fry et al. |
| 2003/0167266 A1 | 9/2003 | Saldanha et al. |
| 2003/0167445 A1 | 9/2003 | Su et al. |
| 2003/0177118 A1 | 9/2003 | Moon et al. |
| 2003/0177341 A1 | 9/2003 | Devillers |
| 2003/0191849 A1 | 10/2003 | Leong et al. |
| 2003/0217033 A1 | 11/2003 | Sandler et al. |
| 2003/0217083 A1 | 11/2003 | Taylor |
| 2003/0218633 A1 | 11/2003 | Mikhail et al. |
| 2004/0060006 A1 | 3/2004 | Lindblad et al. |
| 2004/0122872 A1 | 6/2004 | Pandya et al. |
| 2005/0027658 A1 | 2/2005 | Moore et al. |
| 2005/0050115 A1* | 3/2005 | Kekre .......... G06F 11/2058 714/E11.106 |
| 2005/0055520 A1 | 3/2005 | Kappler |
| 2005/0060345 A1 | 3/2005 | Doddington |
| 2005/0065987 A1 | 3/2005 | Telkowski et al. |
| 2008/0046644 A1 | 2/2008 | De Spiegeleer |
| 2011/0258279 A1 | 10/2011 | Surtani |
| 2012/0246424 A1* | 9/2012 | Yuhara .......... G06F 11/1456 711/162 |

OTHER PUBLICATIONS

D.M, Hilbert et al, An approach to large-scale oliection of application usage data over the Internet (Abstract), Proc. 1998 Int'l Conf. Software Engineering, pp. 136-145 (Apr. 1998).
David S. Lindsay, RMF I/O Validation (Abstract), Proc. CMG XI Int'l Conf. Computer Performance Evaluation, pp. 112-119 (Dec. 1980).
Definition of "cache," Computer Dictionary Online, http:computer-dictionary-online.org (last visited 2007).
Definition of "cache," Microsoft Press Computer Dictionary (3rd ed. 1997).
Lundell Jr. et al, Computer Use—An Executive's Guide (Abstract) (1973).
H.V. Jagadish et al, TAX: A Tree Algebra for XML, 2397 Lecture Notes in Computer Sci. pp. 149-164 (2002).
H.V. Jagadish et al, TIMBER: A Native XML Database, 11 Int'l J. Very Large Databases pp. 274-291 (2002).
Hakan Hacigumus et al, Executing SQL over Encrypted Data in the Database-Service-Provider Model, Proc. 2002 ACM SIGMOD Int'l Conf. Mgmt. Data, pp. 216-227 (2002).
Jason Tsong-Li Wang et al, A System for Approximate Tree Matching, 6 IEEE Trans. Knowledge and Data Engineering pp. 559-571 (Aug. 1994).
John D. Reed et al, A computer-to-computer conversion (Abstract), Datamation, Sep. 1973, at 63-67.
Joseph Hellerstein et al, Generalized Search Tree for Database Systems (Extended Abstract), Proc. 21st VLDB Conf. (1995).
Louise E. Moser, Transactions in a Distributed Object Environment, Final Report 1997-98 MICRO Project, pp. 97-122 (1998).
Maarten van Steen et al, A Model for Worldwide Tracking of Distributed Objects, Proc. TINA '96 (1996).
Mohammed J. Zaki, Efficiently Mining Frequent Tress in a Forest, 17 IEEE Trans. Knowledge and Data Engineering pp. 1021-1035 (Aug. 2005).
Monitor Client Library Programmer's Guide, http://manuals.sybase.com/onlinebooks/group-as/asg1250e/clilib/@Generic_BookTextView/47;pt=497 (last visited Dec. 8, 2006).
P. van Bommel et al, Genetic Algorithms for Optimal Logical Database Design, 36 Info. & Software Tech. 725 (1994).
Peter Pin-Shan Chen, The Entity-Relationship Model—Toward a Unified View of Data, 1 ACM Trans. Database Systems pp. 9-36 (Mar. 1976).
Philip H. Dorn, So you've got to get a new one (Abstract), Datarnaton, Sep. 1973, at 56-62.
Ralph Courtnay, Who pays what? Solution to the job-accounting quandary (Abstract), Computer Decisions, Jul. 1973, at 12-16.
Richard L. Nolan, Plight of the EDP manager (Abstract), 51 Harv. Bus. Rev. pp. 143-152 (May-Jun. 1973).
Robert H. Deng et al, A Probabilistic Approach to Fault Diagnosis in Linear Lightwave Networks, Proc. IFIP TC6/WG6.6 3rd Int'l Symp. on Integrated Network Mgmt., pp. 697-708 (1993).
Robert Strom et al, Gryphon: An Information Flow Based Approach to Message Brokering, Int'l Symp. Software Reliability Engineering (1998).
S. Rao Kosaraju, Efficient Tree Pattern Matching, Proc. 30th Annual Symp. Foundations of Computer Science, pp. 178-183 (1989).
S.G. Linkman, Quantitative monitoring of software development by time-based andintercheckpoint monitoring, Software Engineering J., pp. 43-49 (Jan. 1990).
Shimin Chen et al, Improving Index Performance through Prefetching, ACM SIGMOD Rec., pp. 235-246 (Jun. 2001).
Shuyun Xu et al, ERDraw: An XML-based ER-diagram Drawing and Translation Tool, Proc. ISCA 18th Int'l Conf. Computers and Their Applications, pp. 143-146 (Mar. 2003).
Steve McConnel ed., Gauging Software Readiness with Defect Tracking, IEEE Software, May/Jun. 1997, at 135.
Tze-Jie Yu et al, An Analysis of Several Software Defect Models, 14 IEEE Trans. Software Engineering pp. 1261-1270 (Sep. 1988).
Warren F. McFarlan, Management audit of the EDP department (Abstract), 51 Harv. Bus. Rev. pp. 131-142 (May-Jun. 1973).

* cited by examiner

SAFE STORING DATA FOR DISASTER RECOVERY

This application is a continuation application of U.S. patent application Ser. No. 13/187,479 filed on Jul. 20, 2011. This application incorporates by reference the above-noted earlier filed application in its entirety, and claims priority to the above-noted earlier filed application.

FIELD OF THE INVENTION

The present invention relates generally to data management and, more particularly, to a method for safe storing data in a disaster recovery scenario.

BACKGROUND OF THE INVENTION

Transaction processing systems, particularly those employed in financial institutions, receive and process thousands of transactions a day. Each of these transactions may require operations to be performed on large amounts of data. As such, data management between communicating systems must be highly reliable. If the processing of a transaction fails due to an outage (e.g., a power loss or server failure), then it may be necessary to return a system to a known state of operation. The process of returning to a known state may be referred to as reconciliation.

It is desirable for transaction processing systems to be enabled with mechanisms for protecting against, as well as for recovering from, loss of data due to unexpected outages. Common mechanisms employed for data protection include, but are not limited to: (1) backup of data made to electronic storage media stored at regular intervals; (2) replication of data to an off-site location, which overcomes the need to restore the data (the corresponding systems then need only be restored or synchronized); and (3) high availability systems configured to keep both the data and system replicated off-site, enabling continuous access to systems and data.

In a disaster recovery context, replication of data may also be referred to as data mirroring. Depending on the technologies used, data mirroring may be performed synchronously, asynchronously, semi-synchronously, or point-in-time. As used herein, the term "asynchronous process" refers to a process that executes in the background and occurs as soon as it can in the background. As used herein, the term "asynchronous process" refers to a process that executes directly in line with other processes and does not allow other processes to continue until one or more executable steps (e.g., a put or wire) is completed.

Prior art data mirroring executed synchronously (i.e., using one or more synchronous processes) achieves a recovery point objective (RPO) of zero lost data, but may require unacceptably long execution time of a few minutes to perhaps several hours. Prior art data mirroring executed asynchronously (i.e., using one or more asynchronous processes) may achieve an RPO of just a few seconds, but does not guarantee zero data lost.

In high volume transaction processing systems, such as those used by financial institutions, an RPO of even just a few seconds is not acceptable, and may result in the loss of millions of dollars to clients and/or the transaction system provider. In addition, any remedial steps taken, depending upon the volume of data being received, should not add more than about a 50 to 100 milliseconds additional delay to complete a single message process. A person skilled in the art will recognize that a business can tolerate this time increase in the complete message cycle, since the time to transfer a single message is on the order of 250 milliseconds, mostly as a result of long distances between client and server. Also, a 50 to 100 milliseconds additional delay will not have any noticeable effect unless new messages arrive while the current message is still being processed on a specific channel.

Due to the smaller delays introduced by asynchronous mirroring methods, they are more frequently implemented. Unfortunately, prior art disaster recovery systems that employ asynchronous mirroring methods over long distances run the risk of data loss in the event of an outage. A disaster recovery declaration will result in a systems recovery to a point-in-time preceding the actual outage event. This results in a potential loss of data, which can be several seconds or minutes in duration and account for a plurality of transactions. In such circumstances, a receiving transaction processing system may complete a number of transactions and acknowledge their completion back to a requesting system before a disaster recovery system has safe stored all of the transactions. As used herein, the term "safe storing" refers to a transaction message that is received and stored in its original state prior to being processed.

Solutions are needed to account for and reconcile lost transaction messages, as well as to retrieve and process the same. Unfortunately, the widespread use of MQ network messaging technology with its "destructive" read of message traffic creates an environment whereby lost data cannot be re-sent by the sending systems or cannot be retrieved from message queues associated with the transaction processing system. Thus, a disaster recovery system may have no record of the most recent messages processed by the transaction processing system, thereby necessitating a difficult reconciliation process. This presents an unacceptable financial risk to businesses and requires a solution.

Accordingly, there exists a need for a method and system for safe storing transaction messages, data, and acknowledgements over long distances that permits minimal or no loss of data in a disaster recovery scenario.

SUMMARY OF THE INVENTION

The above-described problems are addressed and a technical solution is achieved in the art by providing a computer-implemented method and system for safe storing transaction messages in a disaster recovery scenario. A client computer sends transaction messages to a remotely located transaction processing computer. At substantially the same time, these transaction messages are also routed to a remotely located disaster recovery computer that is neither colocated with the sending computer or the transaction processing computer.

In a preferred embodiment, a sending queue manager associated with the client computer transmits an asynchronous write of a transaction message to a receiving queue manager associated with the transaction processing computer. Upon receipt, the receiving queue manager transmits a synchronous write of the transaction message to a remote disaster recovery queue manager associated with a remote disaster recovery computer to safe store the transaction message. Thereafter, the receiving queue manager transmits the same transaction message to a transaction processing queue manager where the transaction message is then processed by the transaction processing system, thereby preventing any possible loss of the message/data.

When the transaction message is received b, the remote disaster recovery computer, the corresponding data is written to at least one memory component communicatively coupled to the remote disaster recovery computer at a remote recovery site. In a preferred embodiment, writing the information to the at least one memory component communicatively coupled to the remote disaster recovery computer may further comprise executing a synchronous PUT command. Additionally, when the transaction message is received by the transaction processing computer the corresponding data may also be written to at least one memory component communicatively coupled to the transaction processing computer at a primary site. In a preferred embodiment, writing the information to the at least one memory component communicatively coupled to the transaction processing computer at the primary site may further comprise executing an asynchronous PUT command.

BRIEF DESCRIPTION OF THE DRAWINGS

The present invention will be more readily understood from the detailed description of exemplary embodiments presented below considered in conjunction with the attached drawings in which like reference numerals refer to similar elements and in which.

DETAILED DESCRIPTION OF THE INVENTION

A client computer may not be colocated with a transaction processing computer. As a result, transaction messages may be transmitted between computers over a network. A computer may be any data processing device, such as a desktop computer, a laptop computer, a tablet computer, a mainframe computer, a server, a handheld device, a digital signal processor (DSP), an embedded processor, or any other device able to process data. Computers may be configured with one or more processors and may be communicatively connected to one or more non-transitory computer-readable media and one or more networks. The term "communicatively connected" is intended to include any type of communication may be conducted over a wireless or wired medium and includes, but is not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), or any other applicable communication-enabled mechanism.

The one or more computer-readable media may be used for storing the instructions to be executed by the one or more processors, including an operating system, such as the Windows™, UNIX™, OSX™, or the Linux operating system. The computer readable media may further be used for the storing and retrieval of data in one or more databases. The computer readable media may include a combination of volatile memory, such as RAM memory, and non-volatile memory, such as flash memory, optical disk(s), and/or hard disk(s).

Figure 1:
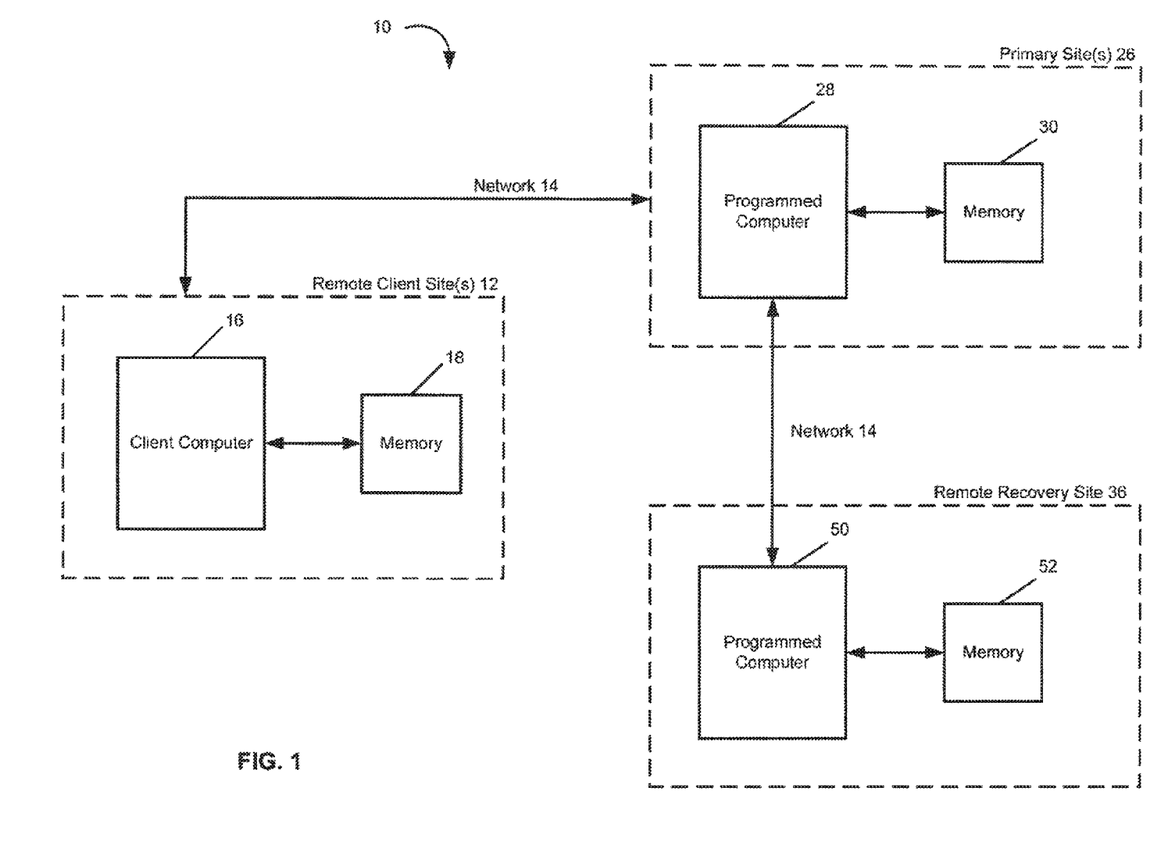
FIG. 1 illustrates a block diagram of an exemplary system for safe storing data in a disaster recovery scenario, in accordance with preferred embodiments of the present invention.
Figure 2:
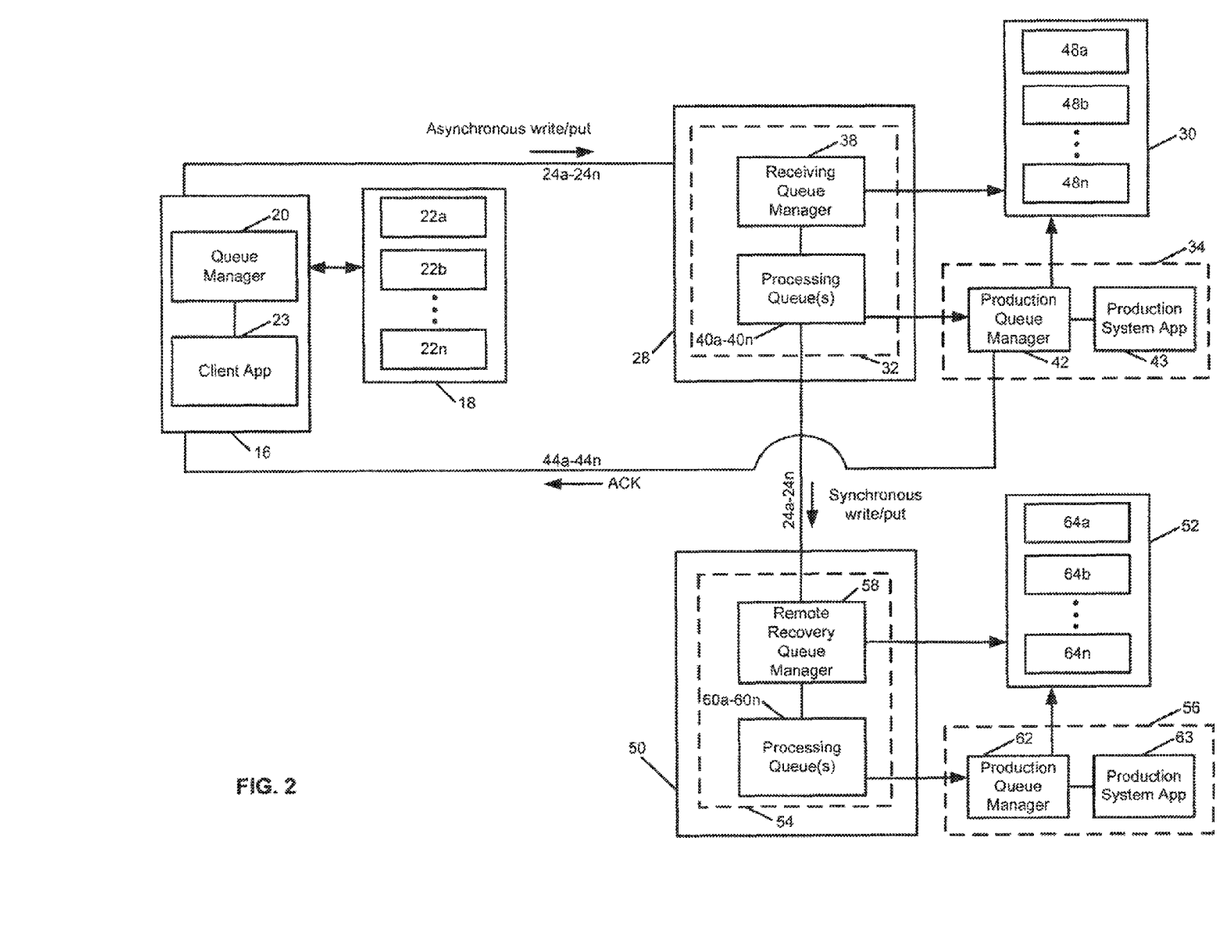
FIG. 2 is a detailed block diagram of software and hardware elements embodied in the system of FIG. 1, in accordance with preferred embodiments of the present invention.

In FIG. 1, an exemplary system 10 for safe storing data in a disaster recovery scenario is provided. FIG. 2 provides additional detail with respect to the components (hardware and software) embodied in system 10 illustrated in FIG. 1. In system 10, one or more remote client sites 12 may be provided and communicatively connected to a network 14. Each of remote client sites 12 may include at least one client computer 16 and an associated memory 18. Data may be transmitted over network 14. Messages may be sent over network 14 via one of several proprietary and/or non-proprietary messaging protocols including, but not limited to, SNA links, MQ links or file transfers.

In a preferred embodiment, the transmitted messages may be transaction messages. The transaction messages may include, but are not limited to, MQ messages. Each of the transaction messages, in turn, may include, but are not limited to, one or more executable methods or commands, data elements or structures associated with the commands, acknowledgement messages, negative acknowledgement messages, function calls, or any other applicable arrangement of data.

Client computer 16 may be a plurality of servers or, alternatively, a single server. Memory 18 may be a plurality of volatile and non-volatile memory devices. As illustrated in FIG. 2, client computer 16 may comprise a sending queue manager 20 and a client application 23. Sending queue manager 20 may be configured to manage one or more message processing queues 22a-22n, provided in memory 18, received from client application 23. Sending queue manager 20 may be further configured to transmit transaction messages 24a-24n to a primary site 26.

Transaction messages 24a-24n are received at primary site 26 and processed by at least one programmed computer 28 and associated memory 30, as illustrated in FIG. 1. Computer 28 may be a plurality of servers or a single server. Memory 30 may be a plurality of volatile and non-volatile memory devices. In a preferred embodiment, computer 28 may comprise a message routing server 32, as illustrated in FIG. 2, configured to route transaction messages 24a-24n to a production server 34, which may be located at primary site 26 and/or a remote recovery site 36. Message routing server 32 may be configured with a receiving queue manager 38 for managing one or more message processing queues 40a-40n. Receiving queue manager 38 receives transaction messages 24a-24n and transmits the same to message processing queues 40a-40n, which are then relaid to a production queue manager 42 in production server 34. Production queue manager 42, via a production system application 43, is configured to operate on transaction messages 24a-24n and provide corresponding acknowledgement messages 44a-44n back to client computer 16. Transaction messages 24a-24n, along with associated original/processed data and acknowledgement messages 44a-44n, may be stored in one or more databases 48a-48n.

Computer 28 is also configured to transmit the Transaction messages 24a-24n received by computer 28 at primary site 26 may also be transmitted to at least one programmed computer 50 and associated memory 52, over network 14, located at remote recovery site 36. In a preferred embodiment, each of client sites 12, primary site 26, and remote recovery site 36 are not colocated.

Similar to computer 28 at primary site 26, computer 50 may be a plurality of servers or a single server. Similarly, memory 52 may be a plurality of volatile and non-volatile memory devices. In a preferred embodiment, computer 50 may comprise a message routing server 54, as illustrated in FIG. 2, configured to route transaction messages 24a'-24n' to a disaster recovery server 56, which is configured to mirror the processing of transaction messages 24a'-24n' in production server 34. Message routing server 54 may be configured with a remote recovery queue manager 58 for managing one or more message processing queues 60a-60n. Remote queue manager 58 receives transaction messages 24a'-24n' and transmits the same to message processing queues 60a-60n, which are then transmitted to a production queue manager 62 in disaster recovery server 56. Production queue manager 62 is configured to operate, via a production system application 63, on transaction messages 24a'-24n'. Transaction messages 24a'-24n', along with associated original/processed data, may be stored in one or more non-volatile databases 64a-64n.

Figure 3:
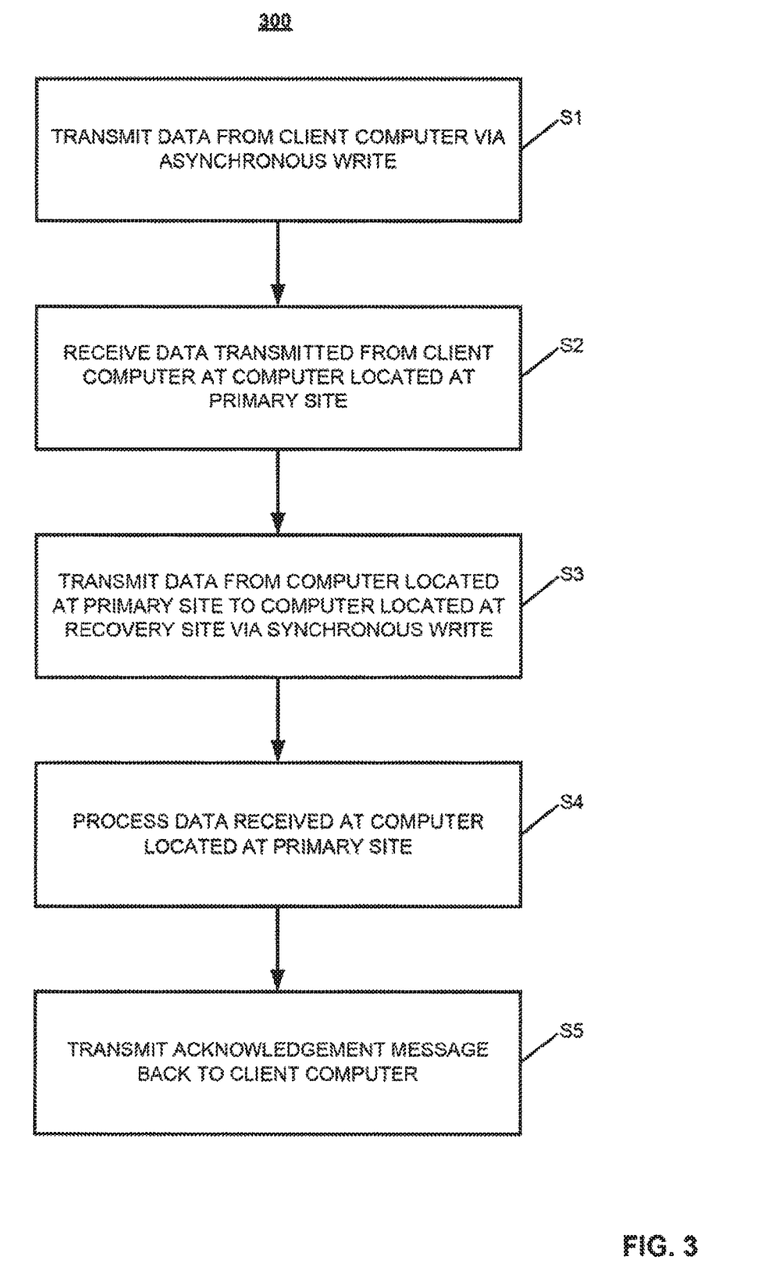
FIG. 3 is a process flow diagram illustrating exemplary steps of a method for safe storing data in a disaster recovery scenario, in accordance with preferred embodiments of the present invention.

In FIG. 3, a process flow 300 is provided to illustrate the steps for safe storing data in a disaster recovery scenario. Process flow 300 is initiated when client computer 16 transmits data, at step S1, over the network 14 to primary site 26. Data is received, at step S2, by computer 28 at primary site 26. In a preferred embodiment, client computer 16 asynchronously writes (i.e., transmits) data to computer 28. Before data is committed to memory 30 at primary site 26, computer 28 synchronously writes, at step S3, the data to computer 50 at remote recovery site 36 via network 14. While data is being synchronously written to recovery computer 50, no other processing may be initiated by computer 28 at primary site 26 before the data is processed by computer 50 at remote recovery site 36. Computer 50 stores the data in memory 52. After the data is stored in memory 52, the data is processed, at step S4, by computer 28 and stored in memory 30 at primary site 26. Computer 28 may additionally transmit, at step S5, an acknowledgement message back to client computer 16 at remote client site 12 over network 14.

Figure 4A:
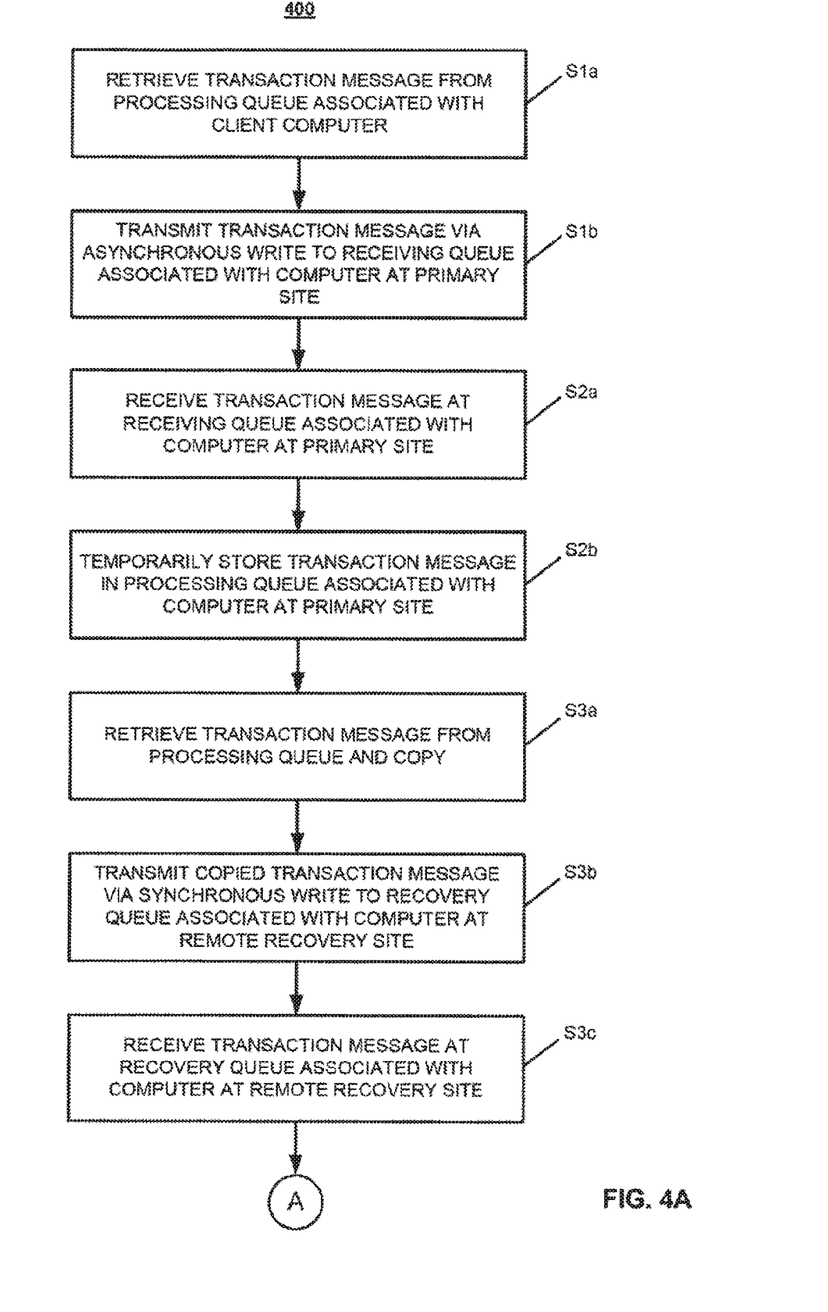
FIGS. 4A and 4B are process flow diagrams illustrating the exemplary steps of FIG. 3 in greater detail, in accordance with preferred embodiments of the present invention.
Figure 4B:
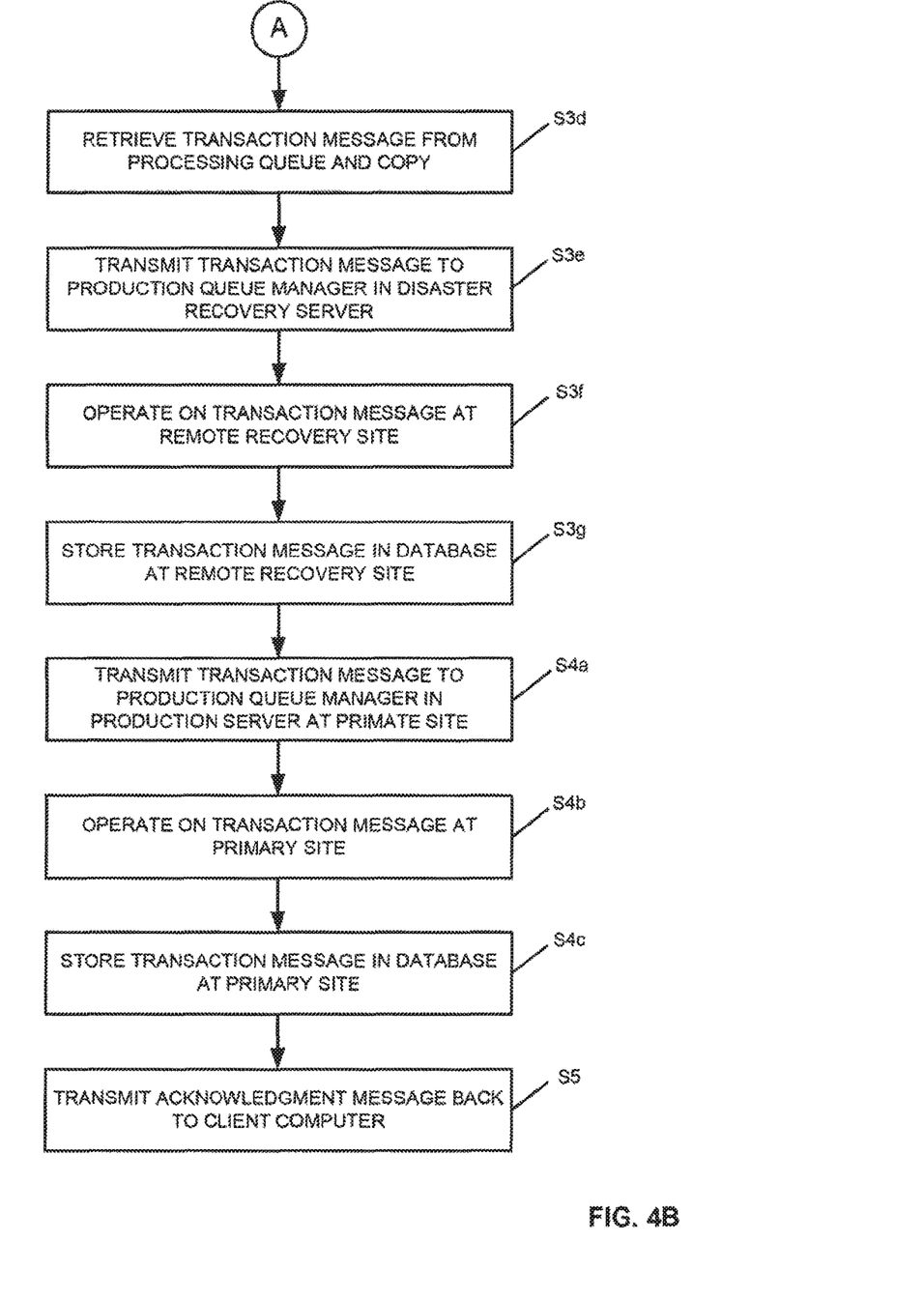

FIGS. 4A and 4B depict a process flow 400 illustrating steps S1-S5 of FIG. 3 in greater detail. Similar to process flow 300, process flow 400 is initiated by client computer 16 sending data to computer 28 at primary site 26. Referring to FIGS. 4A-4B, sending queue manager 20 associated with client computer 16 at the remote client site 12 retrieves, at step S1a, a transaction message (comprising data) 24a from processing queue 22a located in memory 18. Upon retrieving a transaction message, sending queue manager 20 transmits, at step S1b, transaction message 24a over network 14 to primary site 26. More specifically, client computer 16 asynchronously writes (i.e., transmits) transaction message 24a to processing queue 40a via receiving queue manager 38 of computer 28. For example, transaction message 24a may be asynchronously written to processing queues 40a using an asynchronous PUT command.

When transaction message 24a is received, at step S2a, by receiving queue manager 38, transaction message 24a may be temporarily stored, at step S2b, in processing queue 40a. Receiving queue manager 38 may then retrieve, at step S3a, transaction message 24a from processing queue 40a and, because messages may be destructively read from queues, receiving queue manager 38 may further make a copy of transaction message 24a (hereinafter referred to as transaction message 24a'). Then receiving queue manager 38 synchronously writes, at step S3b, transaction message 24a' to processing queue 60a via remote recovery queue manager 58 at remote recovery site 36 over network 14. For example, transaction message 24a' is synchronously written to message processing queue 60a using a synchronous PUT command.

After remote queue manager 58 receives, at step S3c, transaction message 24a', it may then temporarily store the message in processing queue 60a. Remote queue manager 58 retrieves, at step S3d, transaction message 24a' from processing queue 60a and, similar to processing queue 40a at primary site 26, remote queue manager 58 may make a copy of transaction message 24a' (herein after referred to as the "transaction message 24a").

Remote queue manager 58 may then transmit, at step S3e, transaction messages 24a" to production queue manager 62 in disaster recovery server 56. Production queue manager 62 may then operate (i.e., completes the transaction), at step S3f, via recovery system application 63 on transaction message 24a". The processed transaction message 24e may have associated data. As a result, production queue manager 62 may store, ° step S3g, transaction message 24", along with associated original/processed data, in database 64a.

Once the synchronous write of transaction message 24a' to remote recovery site 36 has been completed, transaction message 24a' may be further processed by message routing server 32 at primary site 26. Receiving queue manager 38 of message routing server 32 transmits, at step S4a, transaction message 24a' to production queue manager 42 in production server 34. Production queue manager 42 operates (i.e., completes the transaction), at step S4b, on transaction message 24a' via production system application 43. The processed transaction message 24a' may have associated data. As a result, production queue manager 42 may store, at step S4c, transaction message 24', along with associated original/processed data and acknowledgement message 44a, in database 48a.

Once data has been written to database 48a, receiving queue manager 38 may then send, at step S5, acknowledgement message 44a back to sending queue manager 20 associated with client computer 16 at remote client site 12 over network 14.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for safe storing one or more transaction messages on a handheld mobile device, the method comprising the steps of:

receiving the transaction messages from the handheld mobile device, over a network, via an asynchronous write, on a programmed computer at a primary site, wherein the one or more transaction messages comprises data;

creating a copy of the one or more transaction message received on the programmed computer at the primary site;

transmitting the copy of the one or more transaction messages, over the network, received on the programmed computer at the primary site, via a synchronous write, to a programmed computer at a remote recovery site, wherein the one or more transaction messages received is not operated on at the primary site prior to the copy of the one or more transaction messages being transmitted synchronously to the remote recovery site and wherein the remote recovery site is not colocated with the primary site and the programmed computer at the primary site;

storing the transmitted copy of the one or more transaction messages received in a database at the remote recovery site, wherein the database is communicatively coupled to the programmed computer at the remote recovery site;

operating on the one or more transaction messages received at the primary site after the copy of the one or more transaction messages has been stored at the remote recovery site; and transmitting an electronic acknowledgement from the primary site to a user interface on the hand-held mobile device after storing the copy of the one or more transaction messages at the remote recovery site, said electronic acknowledgement confirming the asynchronous write.

2. The method of claim 1, wherein the at least one memory component is configured as at least one message queue.

3. The method of claim 1, wherein saving the one or more transaction messages to the at least one memory component at the remote recovery site further comprises executing a synchronous PUT command.

4. The method of claim 1, wherein receiving the one or more transaction messages asynchronously at the primary site further comprises saving the one or more transaction messages to at least one memory component communicatively coupled to the programmed computer at the primary site.

5. The method of claim 4, wherein the at least one memory component is configured as at least one message queue.

6. The method of claim 4, wherein saving the one or more transaction messages to the at least one memory component at the primary site further comprises executing an asynchronous PUT command.

7. The method of claim 1, further comprising transmitting an electronic acknowledgement to the remote client computer after operating on the one or more transaction messages at the primary site.

8. The method of claim 1, wherein the one or more transaction messages comprises at least one message.

9. The method of claim 1, wherein the programmed computer at the primary site and the programmed computer at the remote recovery site are not colocated.

10. The method of claim 1, wherein the programmed computer at the primary site is communicatively coupled to the programmed computer at the remote recovery site by a data network.

11. A computer-based system for safe storing one or more transaction messages on a handheld mobile device, the system:

a programmed computer at a primary site for receiving the one or more transaction messages from the handheld mobile device over a network via an asynchronous write wherein the programmed computer creates a copy of the one or more transaction messages received on the programmed computer at the primary site and wherein the one or more transaction messages comprises data;

a transmission engine for transmitting the copy of the one or more transaction messages received on the programmed computer at the primary site, via a synchronous write, to a programmed computer at a remote recovery site, wherein the one or more transaction messages received is not operated on at the primary site prior to the copy of the one or more transaction messages being transmitted synchronously to the remote recovery site and wherein the remote recovery site is not colocated with the primary site and the programmed computer at the primary site;

a storage engine for storing the transmitted copy of the one or more transaction messages received in a database at the remote recovery site, wherein the database is communicatively coupled to the programmed computer at the remote recovery site;

an operation engine for operating on the data received at the primary site after the copy of the one or more transaction messages has been stored at the remote recovery site; and an acknowledgement transmission engine for transmitting an electronic acknowledgement from the primary site to a user interface on the hand-held mobile device after storing the copy of the one or more transaction messages at the remote recovery site, said electronic acknowledgement confirming the asynchronous write.

12. The system of claim 11, wherein the at least one memory component is configured as at least one message queue.

13. The system of claim 11, wherein saving the one or more transaction messages to the at least one memory component at the remote recovery site further comprises executing a synchronous PUT command.

14. The system of claim 11, wherein receiving the one or more transaction messages asynchronously at the primary site further comprises saving the one or more transaction messages to at least one memory component communicatively coupled to the programmed computer at the primary site.

15. The system of claim 14, wherein the at least one memory component is configured as at least one message queue.

16. The system of claim 14, wherein saving the one or more transaction messages to the at least one memory component at the primary site further comprises executing an asynchronous PUT command.

17. The system of claim 11, wherein the acknowledgement transmission engine transmits an electronic acknowledgement to the remote client computer after operating on the one or more transaction messages at the primary site.

18. The system of claim 11, wherein the one or more transaction messages comprises at least one message.

19. The system of claim 11, wherein the programmed computer at the primary site and the programmed computer at the remote recovery site are not colocated.

20. The system of claim 11, wherein the programmed computer at the primary site is communicatively coupled to the programmed computer at the remote recovery site by a data network.

* * * * *